United States Patent  
Franzius et al.

(10) Patent No.: US 12,455,669 B2
(45) Date of Patent: Oct. 28, 2025

(54) VIRTUAL TOOLS FOR SUPPORTED TELE-OPERATIONS

(71) Applicant: Honda Motor Co., Ltd., Tokyo (JP)

(72) Inventors: Mathias Franzius, Offenbach (DE); Dirk Ruiken, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/593,955

(22) Filed: Mar. 3, 2024

(65) Prior Publication Data

US 2025/0278165 A1   Sep. 4, 2025

(51) Int. Cl.
*G06F 3/04815* (2022.01)
*G06F 3/038* (2013.01)
*G06F 3/04847* (2022.01)

(52) U.S. Cl.
CPC .......... *G06F 3/04815* (2013.01); *G06F 3/038* (2013.01); *G06F 3/04847* (2013.01)

(58) Field of Classification Search
CPC ... G06F 3/04815; G06F 3/038; G06F 3/04847
See application file for complete search history.

(56) References Cited

U.S. PATENT DOCUMENTS

| | | | | |
|---|---|---|---|---|
| 9,272,418 B1 * | 3/2016 | Guerin | .................. | B25J 9/1661 |
| 9,317,108 B2 * | 4/2016 | Touma | .................... | G06F 3/014 |
| 2002/0140633 A1 * | 10/2002 | Rafii | ...................... | G02B 27/01 |
| | | | | 345/8 |
| 2008/0224995 A1 * | 9/2008 | Perkunder | ........... | G06F 3/04847 |
| | | | | 345/184 |

OTHER PUBLICATIONS

Kelleher R. Guerin et al., "Adjutant: a Framework for Flexible Human-Machine Collaborative Systems", 2014 IEEE/RSJ International Conference on Intelligent Robots and Systems (IROS 2014), Sep. 14-18, 2014, pp. 1392-1399.

* cited by examiner

*Primary Examiner* — Antonio Xavier
(74) *Attorney, Agent, or Firm* — JCIPRNET

(57) ABSTRACT

A user interface for instructing a tele-operating system and the tele-operating system are provided. The user interface includes an output device configured to output at least one virtual tool representation of at least one tool to an operator of the tele-operating system, and an input device configured to obtain a selection instruction from the operator for selecting one of the output at least one virtual tool representation. The user interface further includes a control circuit configured to determine a task based on the selected virtual tool representation, control displaying the selected virtual tool representation to the operator via the output device, acquire an action instruction from the operator via the input device, interpret the acquired action instruction based on the determined task, and control the tele-operating system to perform an action using the at least one tool based on the interpreted action instruction and the selected virtual tool representation.

19 Claims, 3 Drawing Sheets

VIRTUAL TOOLS FOR SUPPORTED TELE-OPERATIONS

TECHNICAL FIELD OF THE DISCLOSURE

The disclosure relates to the general field of virtual reality and interfaces for tele-operating systems. In particular, a user interface for a tele-operating system, a computer-implemented method for controlling a tele-operating system and a corresponding program are disclosed.

TECHNICAL BACKGROUND

In artificial intelligence (AI) supported tele-operation exists a spectrum of assistance between no support, mid-level task support, and full autonomy of the robot. Current tele-operating systems apply in the user interface (UI) a virtual reality (VR) or augmented reality (AR) system, whose efficiency relies on an intuitive and efficient communication of settings, preferences and constraints of the assistance functions.

Tele-operation, sometimes referred to as remote operation, indicates operation of a system or a machine located at a distance. Teleoperation is an example of a human-machine system. Tele-operating systems provide a spectrum of autonomy ranging from manual control to full autopilot for autonomous devices (robots).

In tele-operation, the state of the art includes a robot with a universal actuator and an operator directly controlling movements of the actuator. A typical example for the universal actuator is a gripping manipulator. Nevertheless, a direct control of the manipulator by the operator often provides movements of the manipulator, which are inefficient and inaccurate.

An alternative approach in the field of tele-operation equips the robot with a specialized actuator that includes a specific tool attachment. Alternatively, the robot comprises a generic actuator that is holding a specific tool like a spanner, and the operator controls the tool in a 1:1 manual control mode. Although the efficiency of this alternative approach may be improved when compared with the approach that uses the robot equipped with the universal actuator, the alternative approach requires the robot to mount the specialized tool.

In praxis, a robot often has difficulties to set constraints on a physical tool like a torque wrench, or may even not be capable to set the constraints on the physical tool.

Alternatively, the robot may use a specialized tool, e.g., a power drill, which is less flexible than the universal tool and often is significantly more expensive.

Generally, in AI-supported teleoperation, the state of the art burdens the operator with selecting a particular support mode for execution by the robot explicitly from a text menu or by pressing a button or moving a slider in the VR user interface, which is not intuitive to use. In a specific example, the operator selects a final torque and a rotation speed for the torque wrench using dials in the VR user interface.

U.S. Pat. No. 9,272,418 B1 discloses a user interface for an operator in tele-operations that enables learning teaching capabilities to a robot. Each capability of the robot requires a set of constraints as user input from the operator. The user interface provides interface elements that support inputting the respective constraints for each capability of the robot. The operator has to know what each capability does and what constraints he should provide for each capability. The operator chooses the desired capability of the robot in the user interface and sets the desired constraints for the selected capability. Setting the required constraints in advance is necessary in order to perform successfully the intended action.

The discussed aspects of tele-operating systems indicate that improved tele-operating systems and improved user interfaces for tele-operating systems are desirable.

SUMMARY OF THE INVENTION

A user interface for a tele-operating system according to independent claim 1, a tele-operating system and a computer-implemented method according to the corresponding independent claims address this among other issues.

According to a first aspect of the disclosure, the user interface for instructing a tele-operating system to perform an action comprises an output device configured to output at least one virtual tool representation of a at least one tool to an operator of the tele-operating system, and an input device configured to receive a selection instruction from the operator for selecting one of the output at least one virtual tool representations. The user interface comprises a control circuit configured to determine a task based on the selected virtual tool representation, to control displaying the selected virtual tool representation to the operator via the output device, and to acquire an action instruction from the operator via the input device. The control circuit is configured to interpret the acquired action instruction based on the determined task, and to control the tele-operating system to perform an action using the at least one tool based on the interpreted action instruction and the selected virtual tool representation.

According to a second aspect, a tele-operating system includes the user interface according to the first aspect.

According to a third aspect, a computer program product comprising a non-transitory computer readable medium having a computer readable program embodied therein, wherein the computer readable program, when executed on a computing device, causes the computing device to perform steps of outputting, via an output device, at least one virtual tool representation of at least one tool to an operator of the tele-operating system; obtaining, via an input device, a selection instruction from the operator for selecting one of the output at least one virtual tool representations; determining, by a control circuit, a task based on the selected virtual tool representation, displaying, via the output device, the selected virtual tool representation to the operator, acquiring, via the input device, an action instruction from the operator, interpreting, the acquired action instruction based on the determined task, and controlling the tele-operating system to perform an action using the at least one tool based on the interpreted action instruction and the selected virtual tool representation.

The dependent claims define advantageous embodiments of the user interface and the tele-operating system.

BRIEF DESCRIPTION OF THE DRAWINGS

The aspects and implementation of the present disclosure will be explained in the following description of specific embodiments in relation to the enclosed drawings.

Figure 1:
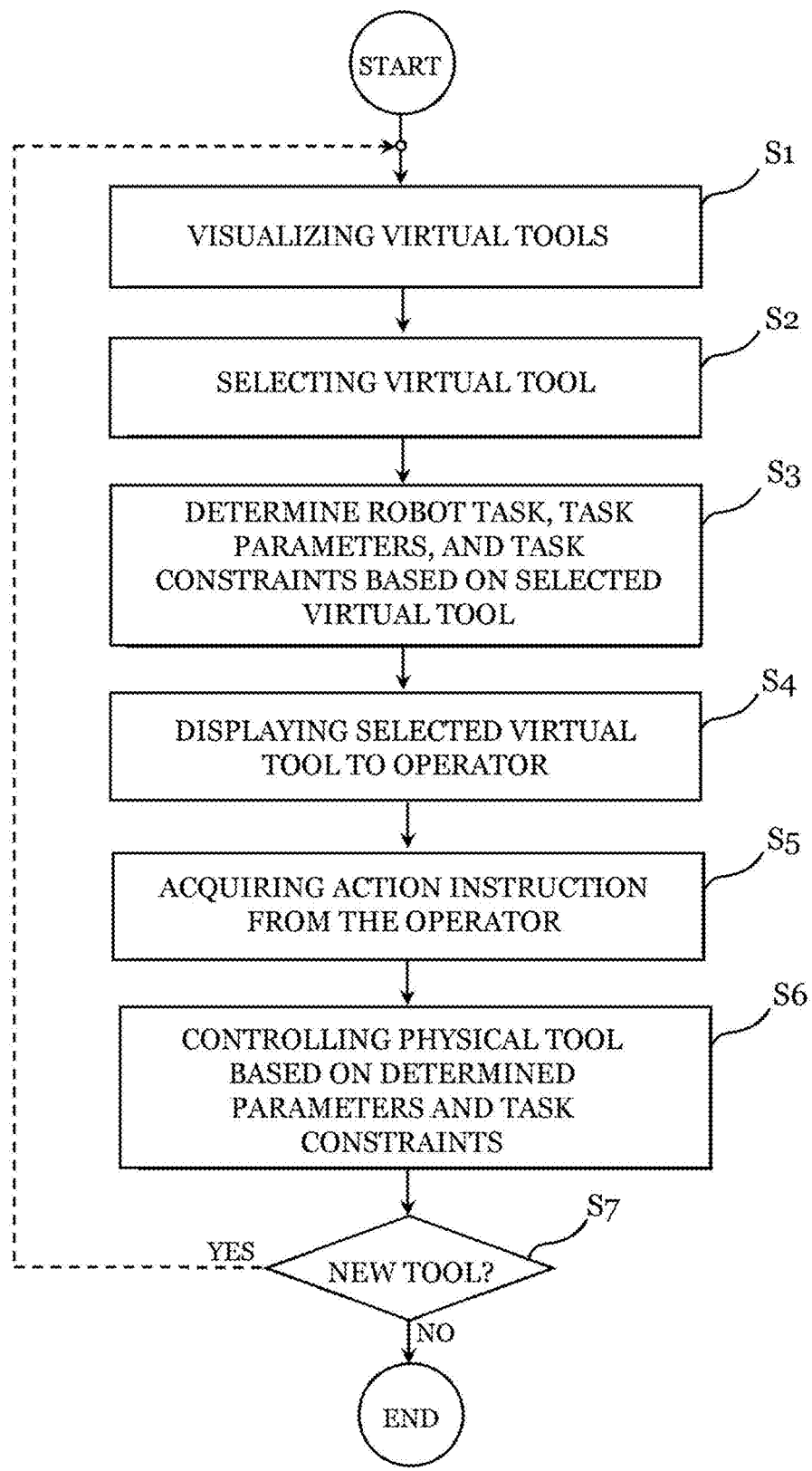
FIG. 1 illustrates a simplified flowchart providing an overview of method steps of controlling a robot with a tele-operating system.

The description of figures uses same references numerals for same or corresponding elements in different figures. The description of figures dispenses with a detailed discussion of same reference numerals in different figures whenever considered possible without adversely affecting comprehensibility. The figures and the elements shown in the figures are not necessarily to scale.

DETAILED DESCRIPTION

The expression virtual tool refers to a tool metaphor, a representation of a tool (physical tool) in the user interface. The virtual tool refers to or is associated with a physical tool that is well known to a large group of potential operators. Hence, its function and its operating constraints are intuitively clear to the operator. A tool metaphor has a graphical representation in the user interface and is further associated with typical parameters, e.g., dimensions of a cutting head, and constraints, e.g., constraining a circular saw to operating parallel to a work surface.

The expression physical equivalent tool (PET) refers to the actual physical tool that is equivalent to a virtual tool.

The user interface according to the disclosure is an intuitive interface that uses depictions of actual tools as metaphors to enable selecting the action of the tele-operating robot that provides the desired level of control over the tele-operating process. The selection offers the operator with the choice of the level of control via a metaphor interface. The disclosure offers an intuitive user interface in VR or AR by visualizing virtual tools like a wrench, a torque-controlled ratchet spanner, or a power drill. Selecting these virtual tools defines the operator intentions for the support. The virtual tool is displayed and can be controlled in VR by the operator. On the physical side, the robot does not change tools but emulates the virtual tool with a standard tool. Thus, an operator proficient with the usual tools for direct manipulation of an object, e.g., a standard wrench, can intuitively use the tele-operating system for controlling the robot.

The disclosed user interface provides an intuitive interface that uses depictions of actual tools in the form of the virtual tool representations as metaphors to select the robot action. Contrary to known approaches, the user interface does not focus on information on how, for example, a drill tool might have to be aligned in order to functionally perform the drilling or screwing action. Instead, by seeing at least one virtual tool representation corresponding to a physical tool and selecting the specific virtual tool representation, the user selects a specific function and a level of control over the function execution by the tele-operating system. Supplementary information for function execution still needs to be acquired by a supporting system.

The selection is aimed at letting the operator choose the level of control via a metaphor interface. The tool metaphor is an element of user interface design for graphical user interfaces e.g. a brush metaphor or a spray can metaphor in a drawing program. However, these tool metaphors are applied exclusively for controlling digital computers and not for controlling a physical interaction with an object using tele-robotics.

According to an embodiment, the user interface has the control circuit configured to determine task parameters and task constraints based on the selected virtual tool representation, and to interpret the acquired action instruction based on the determined task, task parameters and task constraints.

The user interface according to an embodiment includes the output device configured to output plural virtual tool representations of a plurality of tools to the operator. The performed action executed by the robot approximates using a tool that corresponds to the selected virtual tool representation by using a different tool of the plurality of tools.

In an embodiment of the user interface, each virtual tool representation comprises at least one adjustable tool constraint.

The adjustable tool constraint may include at least one of a direction constraint, a size constraint, a maximum speed setting, and a maximum thickness of removed material from an object.

In an embodiment of the user interface, the at least one virtual tool representation includes elements that are configured to be manipulated by the operator for adapting the adjustable tool constraint.

The user interface according to an embodiment has the at least one virtual tool representation including operating elements, in particular a virtual slide control or a rotary control, that are configured to be manipulated by the operator for adapting numerically the adjustable tool constraint.

The user interface according to an embodiment is part of a virtual reality system or augmented reality system.

In an embodiment of the user interface, the input device includes a pointer device.

In the second aspect of the disclosure, the tele-operating system includes the user interface according to any one of the embodiments.

The tele-operating system according to an embodiment includes a multi-purpose physical tool configured to perform a plurality of actions corresponding to action capabilities of the plurality of tools.

According to an embodiment, the tele-operating system includes a specialized tool configured to perform actions corresponding to an action capability of the selected virtual tool representation, and a control circuit is configured to control the specialized tool based on task constraints of the selected virtual tool representation to perform the action.

The tele-operating system according to one embodiment is configured to operate in a direct control mode, and, when operating in the direct control mode, the control circuit is configured to determine whether controlling the tele-operating system based on the interpreted action instruction for performing the action results in violating the at least one tool constraint. In case of determining violating at least one tool constraint, the control circuit is configured to output feedback information on the determined violation via the output device to the operator.

The tele-operating system according to one embodiment is configured, when operating in the direct control mode, to determine whether controlling the tele-operating system based on the interpreted action instruction for performing the action results in approaching a violation of the at least one tool constraint.

The tele-operating system according to an embodiment is configured to generate and output feedback information including a visual, acoustic or tactile warning when determining an approach to a violation of the at least one tool constrain.

According to an embodiment of the tele-operating system, the tele-operating system is configured to stop operating the tool or to decrease a speed of the tool when determining an approach to a violation of the at least one tool constraint.

The tele-operating system according to an embodiment is configured to predict a tool trajectory of the tool and to project the predicted tool trajectory to constraints associated with the tool.

The tele-operating system according to an embodiment is configured to operate in an indirect control mode, wherein in the indirect control mode, the tele-operating system is configured to determine and store in a data storage control commands for controlling the tele-operating system based on the interpreted action instruction for performing the action. The tele-operating system is configured to obtain the stored control commands and to perform control of the tele-operating system based on the obtained control commands.

The tele-operating system according to an embodiment is, when operating in the indirect control mode, configured to select a tool or a plurality of tools for performing the action.

In an embodiment of the tele-operating system, the tele-operating system is, when operating in the indirect control mode, configured to simulate an operation of the tele-operating system, in particular simulating and visualizing, via the output device, the simulated effects of operating the at least one tool based on the stored control commands in real-time.

The following discussion of embodiments uses outputting, via the output device of the user interface, a plurality of virtual tool representations of a plurality of tools to the operator. The operator then selects one of the output virtual tool representations. In an alternate scenario also encompassed by the disclosure, the output device of the user interface outputs one virtual tool representation of one tool to the operator of the tele-operating system. The operator then selects, by inputting the selection instruction, the one output virtual tool representation.

Figure 2:
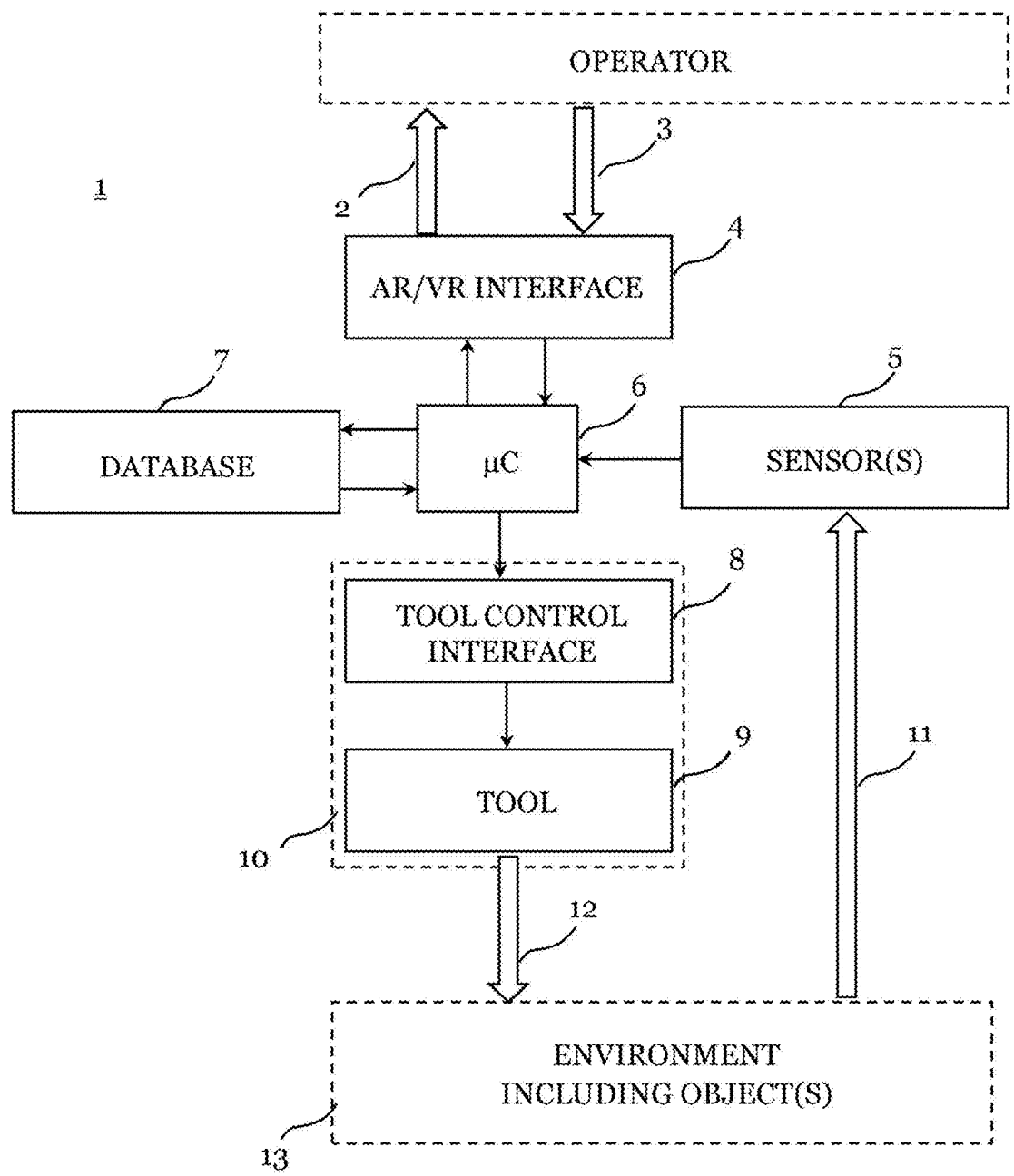
FIG. 2 shows a block diagram illustrating a user interface for instructing a tele-operating system and the elements of the tele-operating system.

FIG. 1 illustrates a simplified flowchart providing an overview of method steps of controlling a robot 10 in a tele-operating system 1, which is illustrated in FIG. 2.

The tele-operating system 1 comprises a user interface for instructing the tele-operating system 1 to perform a specific function or action, or sequences of actions.

The user interface comprises an output device configured to output virtual tool representations of a plurality of tools to an operator of the tele-operating system, and an input device configured to obtain a selection instruction from the operator for selecting one of the output virtual tool representations.

The user interface comprises a control circuit 6 configured to determine a task, task parameters and task constraints based on the selected virtual tool representation. The control circuit may form part of a computing device that includes a memory for storing data in a database 7. Some specific aspects of a physical implementation are discussed with reference to FIG. 2.

The method for controlling the user interface may, when executed by the control circuit 6, e.g., as a part of a computing device, cause the computing device to perform a step S1 of outputting, via the output device, virtual tool representations of a plurality of tools 9 to an operator of the tele-operating system 1.

The virtual tool representations may be associated with additional tool parameters and settings, e.g. directions and sizes of tool constraints, or maximum rotational speed settings, or maximum feed rates, or maximum thickness of removed material. The tool parameters may be visualized as variants of virtual tool representations corresponding to, e.g., a larger or smaller belt sander, or to different grinding attachments to a multipurpose tool.

The additional tool constraints may be defined by corresponding parts of the virtual tool representation that may be manipulated by the operator, e.g., a size of the base plate of a virtual circular saw, or a diameter of a grinder tool.

Alternatively, additional tool constraints may be set by the operator numerically using a slider or other traditional graphical user interface (GUI) elements output by the tele-operating system 1 via the output device.

In step S2, the operator selects one virtual tool representation of the displayed plurality of virtual tool representations. The control circuit 6 performs in step S2 obtaining, via the input device of the user interface, a selection instruction from the operator for selecting one of the output plurality of virtual tool representations.

The computer-implemented method proceeds with determining a task, task parameters and task constraints based on the selected virtual tool representation in step S3 following to step S2.

The task defines the target the robot 10 is intended to achieve for supporting the human, in particular the operator by executing an action, a sequence of actions using at least one actuator of the robot, e.g. including the tool 9 (physical tool 9).

The task parameter is a numerical or similar measurable factor of typically a set of conditions for performing the task in the environment 13. The task parameter is a quantity with a selectable value for the specific circumstances of the task. In relation to one task parameter, other task parameters of the set of task parameters for the specific task may be set. Task parameters may include, e.g., directions and sizes of constraints, or maximum rotational speed settings of a rotating tool 9, or a maximum thickness of removed material from an object (work piece).

Generally, the task constraints are constraints or boundary conditions of the specific task. The task may be interpreted as an ordered group of constraints to be achieved by the actuators, in particular by the tools 9 of the robot 10. In the present case, the task constraints are set by selecting the specific virtual tool representation from the plurality of virtual tools. In an example, a specific task constraint associated with a grinding tool (grinder) is the diameter of the grinder.

In step S4, the computer-implemented method displays, via the output device, the selected virtual tool representation to the operator.

In step S5, the method acquires, via the input device, an action instruction from the operator. The method proceeds with interpreting, the acquired action instruction based on the determined task parameters and task constraints.

In step S6 following to step S5, the method controls the tele-operating system to perform an action using the tool (physical tool) corresponding to the selected virtual tool based on the interpreted action instruction and the selected virtual tool representation.

In step S7, the method determines whether a new tool is required. For example, the operator of the tele-operating system 1 may intend to use a new tool for continuing the task. In case of determining that a new tool is required (YES), the method proceeds to step S1. The method then continues with a new processing loop by running steps S1 to S6 again. In case of determining that a new tool is not required (NO), the processing of the method terminates. Step S7 and the processing loop represents an optional step of the displayed method in FIG. 1.

FIG. 2 shows a block diagram illustrating a user interface for controlling the tele-operating system 1, and elements of the tele-operating system 1.

The user interface may be part of a virtual reality (VR) or augmented reality (AR) system.

The tele-operating system 1 may operate in different control modes including a direct control mode or in an indirect control mode.

In the direct control mode, the tele-operating system performs a direct 1:1 control of the actual physical end effector of the robot. In the direct control mode, the tele-operating system 1 controls the tele-operating system 1, in particular the tool 9 directly based on the determined action instruction from the operator. In the direct control mode, no simulation of the operation of the tele-operating system 1, and in particular of the tool control of the tool 9 is performed. Control commands are not stored in the database 7 for a later control of the tool. In the direct control mode, the tele-operating system 1 controls the tool 9 online. Characteristically, when operating in the direct control mode, the tele-operating system 1 determines whether controlling the tele-operating system 1 based on the interpreted action instruction for performing the action results in approaching a violation of the at least one tool constraint of the tool 9 corresponding to the selected virtual tool representation.

When operating in the direct control mode, the tele-operating system 1 may determine whether during operation of the tool 9, the operator instructs the selected virtual tool with an action that the physical tool 9 cannot perform due to its tool constraints. E.g., the operator instructs the virtual tool representation to perform a tool trajectory that the associated physical tool cannot follow.

In case of determining such violation of a tool constraint, the tele-operating system 1 may output a respective warning by outputting a warning signal to the operator via the output device of the VR/AR interface 4. The warning signal may include a visual warning encoded in a color or a periodic change of an intensity (blinking) of a visual signal or a respective sound signal.

Alternatively or additionally, the tele-operating system 1 may, in case of determining such violation of a tool constraint to be imminent, automatically reduce a feed rate or a velocity of the physical tool 9, or stop operation of the physical tool 9. The tele-operating system 1 may determine such violation of a tool constraint to be imminent when a difference between a predicted trajectory of the physical tool 9 generated based on the acquired instruction from the operator and a constraint of the physical tool 9 is determined to be smaller than a threshold.

Alternatively or additionally, the tele-operating system 1 may, in case of determining such violation of a tool constraint at least imminent or already occurring in the direct control mode, temporarily detach a trajectory of the selected virtual tool from an 1:1 control by the operator and project the trajectory of virtual tool as instructed by the operator to the tool constraint defined by the physical tool 9 that is associated with the selected virtual tool. E.g., the tele-operating system 1 may maintain a path of the tool 9 perpendicular to a surface of the object (work piece) instead of tilting the tool 9 relative to the surface.

The direct control mode is advantageous in scenarios and applications of the robot 10 that has the capability to perform the intended operation at least approximately in real-time. In a specific example, the robot 10 comprises a tool 9 with, e.g., a sander that is sufficiently large to emulate a virtual belt sander when chosen by the operator as the selected virtual tool representation.

In the indirect control mode, the tele-operating system 1 determines and stores in a database 7 control commands for controlling the tele-operating system 1 based on the interpreted action instruction for performing the action obtained from the operator. The tele-operating system 1 obtains the stored control commands from the database 7 and performs control of the tele-operating system 1 based on the obtained control commands. The indirect control mode is particularly suited for applications, in which the selected virtual tool is more capable than the physical tools 9 available to the robot 10. This is the case, when the virtual tool representation for corresponds to, e.g., a belt sander and the robot 10 emulates the selected virtual tool using as physical tool 9 a small rotary sander.

In the indirect control mode, the tele-operating system may select a tool 9 or a plurality of tools 9 for performing the action defined in the action instruction acquired from the operator via the AR/VR interface 4. The tele-operating system 1 may select the most appropriate physical tool for performing the task as instructed by the operator by selecting the virtual tool representation. The most appropriate physical tool 9 may be a physical tool 9, which has a set of tool constraints that are determined to be closest to the tool constraints of the selected virtual tool.

Additionally or alternatively, while operating in the indirect control mode, the tele-operating system 1 may provide support by simulating the instructed action or series of actions for the operation, e.g. simulating the effect of operating the tool 9 based on the instruction in real-time and visualize the results of the simulation to the operator, e.g., via the output device.

The tele-operating system 1 includes an augmented reality/virtual reality interface 4 (AR/VR interface 4), a control circuit 6 and a database 7 stored in a memory configured for storing the database.

The AR/VR interface 4 may operate as an augmented reality (AR) interface that seamlessly blends the real world in the environment as perceived with the senses of the operator with computer-generated content using one or multiple senses of the operator, e.g. additional computer-generated image data. The AR interface enhances the perception of the environment by the operator by overlaying additional information generated by a computer. In present disclosure, the control circuit 6 generates and outputs virtual tool representations of a plurality of tools to an operator of the tele-operating system 1, wherein the plurality of virtual tool representations may be shown as overlaying additional information in an optical head-mounted display to the operator.

Alternatively, the AR/VR interface 4 may operate as a virtual reality (VR) interface that replaces the real environment with an artificial environment, which the operator experiences by sensory stimuli provided by a computer. The actions the operator performs at least partially determine what happens in the environment. The VR interface may include hardware for pose tracking of the operator and three-dimensional (3D) near eye display of images and videos.

The AR/VR interface 4 may include an output device for outputting output information 2 to the user (operator) and input device for obtaining input information 3 from the operator. The output device of the AR/VR interface 4 may include a display, e.g., a computer monitor, or an image projector that projects an image onto a surface, for visually displaying information to the operator.

The display device may include a wearable device, e.g. an optical head-mounted display that displays information in a hands-free format.

The output device, in particular, outputs virtual tool representations corresponding to a plurality of tools 9 to the operator of the tele-operating system 1.

The output device, in particular, displays the selected virtual tool representation to the operator.

The output device may further output feedback information in case that the tele-operating system 1 determines that a violation of at least one tool constraint is about to occur.

The control circuit 6 may determine when the tele-operating system operates in the direct control mode, whether controlling the tele-operating system 1 based on the interpreted action instruction for performing the action results in violating at least one tool constraint of the tool 9.

In case of the control circuit 6 determining the violation of the at least one tool constraint, the control circuit 6 is configured to output feedback information on the determined violation via the output device of the AR/VR interface 4 to the operator. The output feedback information may include a warning about the determined violation of the at least one tool constraint.

In case of the tele-operating system 1 operating in the indirect control mode, the tele-operating system 1 simulates an operation of the tele-operating system 1, in particular simulates and visualizes, via the output device, the simulated effects of operating the tool 9 based on the stored control commands in real-time.

The AR/VR interface 4 may include an input device for obtaining a selection instruction from the operator for selecting one of the output virtual tool representations presented to the operator.

The input device may include any device that is suited to provide information, data, or control signals to an information processing system, e.g., a computer, and may include at least one of a keyboard, a mouse, joysticks or a microphone.

In particular, the input device may include a pointing device (pointer).

Alternatively or additionally, the input device may include a gesture tracking system for tracking gestures of the operator.

The control circuit 6 may include at least one processor, signal processor, microprocessor, microcontroller (µC), application specific integrated circuit (ASIC), system on a chip (SoC), graphics processing unit (GPU) or a combination of such integrated circuits (IC).

The control circuit 6 may be implemented in a distributed manner, e.g. including data processing resources of the robot 10 or one or plural servers arranged remote to the AR/VR interface 4, to the robot 10, and connected via a communication network not explicitly illustrated in FIG. 2.

The tele-operating system 1 includes further at least one sensor 5 for sensing the physical environment 13 in which the tele-operating system 1 is executing a task using a tool 9 (physical tool 9).

The sensor 5 may include a plurality of sensors forming a sensor suite that acquires sensor information 11 on the environment 13. The sensor 5 may include a camera that acquires images and videos from the environment 13 in which the robot 10 is operating, in particular performing an action, a series of actions or a function under control of the tele-operating system 1.

The tele-operating system 1 includes a tool control interface 8 that obtains a control signal from the control circuit 6, and controls a tool 9 performing an action 12, a sequence of actions or a function on at least one physical object in the environment 13.

The tool control interface 8 and the tool 9 may form part of an autonomously or semi-autonomously operating device 10 (robot 10). The tool control interface 8 generates and outputs a control signal for controlling at least one tool 9 that performs a function by performing an action or series of actions in the environment 13, e.g. on at least one object in the environment 13.

Preferably, the tool 9 is a multifunctional tool that has the capability to perform several individual functions under control of the tool control interface 8.

The physical tools 9 available to the robot 10 may include an arm of the robot 10 including an end effector (manipulator) arranged at the end of the arm. Hence, the end effector, e.g., including a gripper, and the arm represent the tool 9 in this scenario. This application scenario may include, e.g. the action of tightening a screw as a task by using the gripper and the arm of the robot 10 as respective physical tool 9. The operator may select a virtual representation of the torque wrench displayed by the output device. Selecting the virtual representation of the torque wrench offers the operator the possibility to define the desired torque to tighten the screw. The arm and the end effector of the robot 10 include a built-in force-torque sensor and then are the physical tool 9 to perform the instructed action of tightening the screw with the desired torque as the respective task parameter.

The robot 10 may use a general-purpose or multi-purpose actuator to perform the operation indirectly, e.g. more slowly or iteratively than a physical tool 9 corresponding to the selected virtual tool used in the virtual tool representation would.

Alternatively or additionally, the robot 10 uses a specialized tool for the operation, e.g. a sander, but ensures task constraints set for the selected virtual tool representation by control software of the robot actuators instead of using physical guides that the tool corresponding to the virtual tool representation would use. E.g., the flat surface of a belt sander as physical tool 9 ensures an application parallel to or flat on a surface of an object acting as work-piece.

The sensors 5 may be part of an autonomously or semi-autonomously operating device 10 (robot 10).

The robot 10 may be a service robot that assists humans in performing a task that is cumbersome, dirty, dangerous, repetitive, or in a hostile environment. The robot 10 has a degree of autonomy, which according to usual conventions denotes an "ability to perform intended tasks based on current state and sensing, without human intervention". The degree of autonomy may range from a partial autonomy—including human-robot interaction—to full autonomy without active human robot intervention by the operator.

In artificial intelligence- (AI-)supported tele-operation a spectrum of assistance exists from no support, over mid-level task support to full autonomy. The user interface including the VR/AR interface enables intuitive and efficient communication of settings, preferences and constraints of the assistance functions provided by the robot 10.

The operator of a tele-operating system 1 intends to fasten a bolt. Depending on the specific task, the operator may intend to exercise fine-granular control over the bolt turning angle, e.g., 2½ turns, or to turn the bolt with a defined speed and duration, or to fasten the bolt with a predefined torque value.

In the real world without using the tele-operating robot 10, a user would select an appropriate tool for these three targets:

The user may manually turn the bolt or use a wrench, thereby controlling the motion directly;

alternatively, the user may use a power drill and influence rotational speed and duration by pressing a button of the power drill; or further alternatively, the user may use a spanning tool with a torque limiter to turn efficiently up to a defined final torque.

In all three alternative cases, the appropriate tool is the efficient choice with appropriate level of control, high accuracy in goal achievement, and a well-known user interface, e.g., for setting constraints with the torque setting dial. The user interface and the tele-operating system 1 replicate the efficient and intuitive interfaces of the tools for controlling the tele-operating system 1 and the robot 10 without actually requiring the actual physical tools. Using the well-known and intuitive interfaces of the tools may reduce a training time required by the operator on the tele-operating system.

Figure 3:
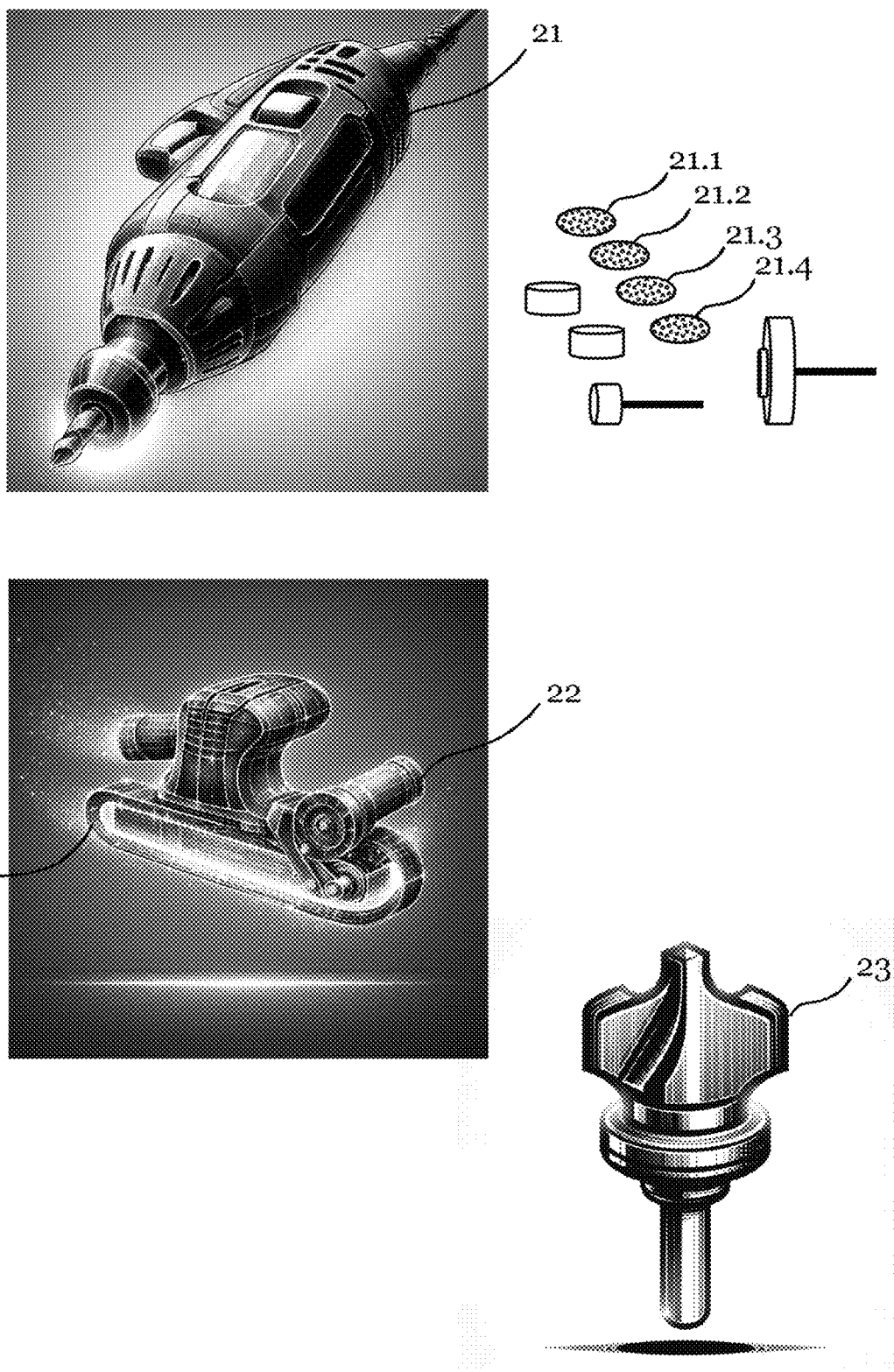
FIG. 3 shows some examples for virtual tools in embodiments of the disclosed tele-operating system.

FIG. 3 shows some examples for virtual tool representations and tools 9 suited for embodiments of the disclosed tele-operating system.

The disclosure offers an intuitive user interface, particularly advantageous in virtual reality applications by visualizing virtual tools like a wrench, a torque controlled ratchet spanner, or a power drill. The operator selects a virtual tool and thereby communicates via the selected tool his intention for the artificial intelligence support. The user interface displays the virtual tool representation to the operator and enables the operator to control the selected virtual tool representation in the virtual environment. On the physical side, in the physical environment, the robot 10 does not change his tool 9 to a physical tool 9 corresponding to the selected virtual tool representation, but emulates the selected virtual tool with a standard tool 9 for operation in the physical environment.

FIG. 3 displays three examples of virtual tool representations and the corresponding actions of the robot 10 in the physical environment.

The processes of "sanding", "polishing", and "routing" uses a respective virtual tool attachment to a virtual rotary tool 21. The virtual tool attachments may include spherical sanding attachments 21.1, 21.2, 21.3, 21.4 or cylindrical sanding attachments with a respectively defined diameter for the multipurpose rotary tool 21. The robot may execute an action applying the corresponding physical tool 9 to the selected virtual rotary tool 21 directly following a trajectory executed by the operator and executing a specific cutting action, e.g. regarding a depth and width of a groove that is defined by the virtual tool attachment with the defined diameter selected by the operator for the multipurpose rotary tool 21.

Selecting the virtual tool representation of a belt sander 22 by the operator defines a process of creating a plane area of a surface of a part (work piece), resulting in a locally flat surface. The operator may control a roughness of the resulting flat surface generated by the robot on the physical part via the user interface by selecting a respective virtual sanding belt 22.1 for the virtual belt sander 22.

Selecting the virtual tool of a "router with a specific tool bit 23" results in controlling the robot to prepare a cut with a predefined shape and depth into a part. The cut may, e.g. be flat, have a 45-degree angle, or may have a shape of a quarter circle with a defined radius, and follow a trajectory, which the operator executes. The virtual trajectory of the virtual tool is constrained to be perpendicular to a surface as when performed with a handheld router. The operator may set additional constraints by adjusting a virtual "ball bearing bit" that defines an adjustable distance to a work surface at a height specific to the tool bit 23. The robot 10 performs the cutting action on the part based on the set distance.

The examples of FIG. 3 are only some exemplary combinations of virtual tools and the corresponding actions. A range of further examples given below includes, but is not limited to, the process of nailing.

The process of nailing includes, e.g., the virtual tool of a "nail gun". The corresponding physical action executed by the robot 10 includes setting a nail at an indicated position on the surface of an object and putting the nail into the object until its head is flush with the surface of the object.

Alternatively or additionally, the process of nailing includes, e.g., the virtual tool of a "hammer". The corresponding physical action executed by the robot 10 includes setting a nail at an indicated position on the surface of the object and pushing or pressing the nail into the object incrementally, e.g., at a feed rate depending on at least one of a size of the selected virtual tool "hammer", a velocity of the virtual hammering gesture executed by the operator, and an amplitude of the virtual hammering gesture executed by the operator. The direction of the hammering gesture corresponding to a direction of nail relative to the surface of the object. The final height of the nail head above the surface of the object may vary between zero, meaning the nail head is flush with the surface, or a value depending on the overall length of the nail.

The process of clamping includes, e.g., the virtual tool of a "clamp". The corresponding physical action executed by the robot 10 includes exerting pressure with a specific (maximum) force at a specific position and direction at an indicated position on the surface of an object.

Alternatively or additionally, the process of clamping includes, e.g., the virtual tool of a "corner clamp". The corresponding clamping process includes constraining two parts in order to keep a specific angle between the parts, which may be set by the operator via the user interface.

The process of cutting includes, e.g., the virtual tool of a "knife". The corresponding physical action executed by the robot 10 includes freehand cutting, essentially unconstrained on the surface of an object following a trajectory performed by the operator, e.g. executed using a pointing device of the user interface.

Alternatively or additionally, the process of cutting includes, e.g., the virtual tool of a "peeling knife". The corresponding cutting process includes a free cutting on the surface of a work piece that is constrained to removing thin chips of material from the surface of the work piece. The operator may set at least one of the depth of material that the robot 10 removes from the work piece and the size of the chips via the user interface.

Alternatively or additionally, the process of cutting includes, e.g., the virtual tool of a "circular saw". The corresponding cutting process includes preparing a cut perpendicular to the surface of a work piece that is otherwise unconstrained after selecting the "jigsaw" virtual tool representation.

Alternatively or additionally, the process of cutting includes, e.g., the virtual tool of a "jigsaw". The corresponding cutting process includes preparing a cut perpendicular to the surface of a work piece that follows the further task constraint of a straight line after selecting the "circular saw" virtual tool representation.

A process of baking includes, e.g., the virtual tool of a "rolling pin". The corresponding physical action executed by the robot 10 includes flatten the dough to a specific height that the operator may adjust via the user interface.

Alternatively or additionally, the process of baking includes, e.g., the virtual tool of a "cookie cutter". The corresponding physical process includes cutting a specific shape and a specific shape into a flat piece of dough rolled out onto a flat surface after the operator selected the "cookie cutter" virtual tool representation.

A process of painting includes, e.g., selecting a virtual tool from a plurality of virtual tools including instances of a "brush", a "paint roll", "sprayer", "pencil", "crayon", e.g. The corresponding physical action executed by the robot 10 includes physically painting or drawing on a surface following a trajectory executed by the operator or based on specific settings the operator did via the user interface. Contrary to the computer graphics software of brush in a painting software, that uses the virtual brush for modifying a screen display in a virtual environment, the robot 10 actually paints or draws the result of respective control by the operator in the physical environment.

A process of greasing includes, e.g., the virtual tools of an "oil dripper", a "grease gun", and a "grease brush", e.g., in a variety of versions or modifications. The corresponding physical action executed by the robot 10 includes at least one of applying grease of a specific consistency, applying the grease in a specific volume and applying grease with a specific pressure to a surface area or a grease nipple of an object.

A process of sorting includes, e.g., the virtual tools of a "sieve", e.g. in a variety of versions, e.g. indicated by sieve inserts with respective diameters of sieve openings. The corresponding physical action executed by the robot 10 includes sorting objects by their respective size, in particular into a first group of objects with a diameter smaller than a selected size (size threshold) and a second group larger than the selected size.

Another process executed by the robot 10 that the operator may control via the user interface includes vacuum cleaning. Selecting the virtual tool of the "vacuum cleaner" may include selecting one specific virtual attachment tool from a plurality of virtual attachment tools presented to the operator via the user interface. The robot 10 may execute the cleaning process by adjusting process parameters such as operating width of the cleaning process and strength of the vacuum based on the selected virtual attachment tool.

The aforementioned examples originate in in particular in a workshop environment or household environment for using the robot 10 in a respective tele-operation application. The discussed applications of the tele-operating system 1 include further application areas, e.g., include disaster recovery robots, and underwater repair or underwater installation by autonomous devices. The tele-operating system may operate in extraterrestrial use scenarios, e.g. in space. The method may prove advantageous in remote work applications in a mechanical or electrical workshop or at the site of a customer in the field. The application areas include household work and maintenance.

All features described above or features shown in the figures can be combined with each other in any advantageous manner within the scope of the disclosure. In the detailed discussion of embodiments, numerous specific details were presented for providing a thorough understanding of the invention defined in the claims. It is evident that putting the claimed invention into practice is possible without including all the specific details.

In the specification and the claims, the expression "at least one of A and B" may replace the expression "A and/or B" and vice versa due to being used with the same meaning. The expression "A and/or B" means "A, or B, or A and B".

What is claimed is:

1. A user interface for instructing a tele-operating system to perform an action, the user interface comprising:
   an output device configured to output plural virtual tool representations of a plurality of tools to an operator of the tele-operating system;
   an input device configured to receive a selection instruction from the operator for selecting one of the output plural virtual tool representations;
   a control circuit configured to
   determine a task on the selected virtual tool representation,
   control displaying the selected virtual tool representation to the operator via the output device,
   acquire an action instruction from the operator via the input device,
   interpret the acquired action instruction based on the determined task, and
   control the tele-operating system to perform an action using at least one tool of the plurality of tools based on the interpreted action instruction and the selected virtual tool representation,
   wherein the action approximates using a tool that corresponds to the selected virtual tool representation by using a different tool of the plurality of tools.

2. The user interface according to claim 1, wherein the control circuit is configured to
   determine task parameters and task constraints based on the selected virtual tool representation, and
   interpret the acquired action instruction based on the determined task, task parameters and task constraints.

3. The user interface according to claim 1, wherein each of the plural virtual tool representations comprises at least one adjustable tool constraint,
   wherein the adjustable tool constraint includes at least one of a direction constraint, a size constraint, a maximum speed setting, and a maximum thickness of removed material from an object.

4. The user interface according to claim 3, wherein the plural virtual tool representations include elements that are configured to be manipulated by the operator for adapting the adjustable tool constraint.

5. The user interface according to claim 3, wherein the plural virtual tool representations include operating elements, in particular a virtual slide control or a rotary control, that are configured to be manipulated by the operator for adapting numerically adjustable tool constraints.

6. The user interface according to claim 1, wherein the user interface is part of a virtual reality system or augmented reality system.

7. The user interface according to claim 1, wherein the input device includes a pointer device.

8. A tele-operating system including a user interface, wherein the user interface comprises:
   an output device configured to output plural virtual tool representations of a plurality of tools to an operator of the tele-operating system;
   an input device configured to receive a selection instruction from the operator for selecting one of the output virtual tool representations;
   a control circuit configured to
   determine a task on the selected virtual tool representation,
   control displaying the selected virtual tool representation to the operator via the output device,
   acquire an action instruction from the operator via the input device,
   interpret the acquired action instruction based on the determined task, and control the tele-operating system to perform an action using at least one tool of the plurality of tools based on the interpreted action instruction and the selected virtual tool representation,
wherein the action approximates using a tool that corresponds to the selected virtual tool representation by using a different tool of the plurality of tools.

9. The tele-operating system according to claim 8, wherein the tele-operating system includes a multi-purpose physical tool configured to perform a plurality of actions corresponding to action capabilities of the plurality of tools.

10. The tele-operating system according to claim 8, wherein
the tele-operating system includes a specialized tool configured to perform actions corresponding to an action capability of the selected virtual tool representation, and
a control circuit is configured to control the specialized tool based on task constraints of the selected virtual tool representation to perform the action.

11. The tele-operating system according to claim 8, wherein
the tele-operating system is configured to operate in a direct control mode,
wherein in the direct control mode, the control circuit is configured to determine whether controlling the tele-operating system based on the interpreted action instruction for performing the action results in violating the at least one tool constraint, and,
in case of determining violating at least one tool constraint, the control circuit is configured to output feedback information on the determined violation via the output device to the operator.

12. The tele-operating system according to claim 8, wherein
the tele-operating system is configured to operate in a direct control mode,
wherein in the direct control mode, the tele-operating system is configured to determine whether controlling the tele-operating system based on the interpreted action instruction for performing the action results in approaching a violation of the at least one tool constraint.

13. The tele-operating system according to claim 12, wherein
the tele-operating system is configured to generate and output feedback information including a visual, acoustic or tactile warning when determining an approach to a violation of the at least one tool constraint.

14. The tele-operating system according to claim 12, wherein
the tele-operating system is configured to stop operating the tool or to decrease a speed of the tool when determining an approach to a violation of the at least one tool constraint.

15. The tele-operating system according to claim 8, wherein
the tele-operating system is configured to predict a tool trajectory of the tool and to project the predicted tool trajectory to constraints associated with the tool.

16. The tele-operating system according to claim 8, wherein
the tele-operating system is configured to operate in an indirect control mode,
wherein in the indirect control mode, the tele-operating system is configured to determine and store in a data storage control commands for controlling the tele-operating system based on the interpreted action instruction for performing the action, and
the tele-operating system is configured to obtain the stored control commands and to perform control of the tele-operating system based on the obtained control commands.

17. The tele-operating system according to claim 16, wherein
in the indirect control mode,
the tele-operating system is configured to select the at least one tool for performing the action.

18. The tele-operating system according to claim 16, wherein
in the indirect control mode,
the tele-operating system is configured to simulate an operation of the tele-operating system, in particular simulating and visualizing, via the output device, the simulated effects of operating the plurality of tools based on the stored control commands in real-time.

19. A non-transitory computer readable medium having a computer readable program embodied therein, wherein the computer readable program, when executed on a computing device, causes the computing device to perform:
outputting, via an output device, plural virtual tool representations of a plurality of tools to an operator of the tele-operating system;
obtaining, via an input device, a selection instruction from the operator for selecting one of the output plural virtual tool representations;
determining, by a control circuit, a task based on the selected virtual tool representation,
displaying, via the output device, the selected virtual tool representation to the operator;
acquiring, via the input device, an action instruction from the operator;
interpreting, the acquired action instruction based on the determined task; and
controlling the tele-operating system to perform an action using at least one tool of the plurality of tools based on the interpreted action instruction and the selected virtual tool representation,
wherein the action approximates using a tool that corresponds to the selected virtual tool representation by using a different tool of the plurality of tools.

* * * * *